United States Patent
Luo et al.

(10) Patent No.: US 7,015,956 B2
(45) Date of Patent: Mar. 21, 2006

(54) METHOD OF FAST AUTOMATIC EXPOSURE OR GAIN CONTROL IN A MOS IMAGE SENSOR

(75) Inventors: Xiaodong Luo, Sunnyvale, CA (US); Xinping He, San Jose, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 902 days.

(21) Appl. No.: 10/055,044

(22) Filed: Jan. 25, 2002

(65) Prior Publication Data

US 2003/0142223 A1    Jul. 31, 2003

(51) Int. Cl.
*H04N 5/235* (2006.01)
(52) U.S. Cl. .............................. 348/229.1; 348/221.1; 348/362
(58) Field of Classification Search ................ 348/362, 348/216.1, 221.1, 229, 229.1
See application file for complete search history.

(56) References Cited

U.S. PATENT DOCUMENTS

| | | | | |
|---|---|---|---|---|
| 5,386,231 A | * | 1/1995 | Shimizu et al. | 348/296 |
| 5,559,555 A | * | 9/1996 | Shimizu et al. | 348/364 |
| 5,579,049 A | * | 11/1996 | Shimaya et al. | 348/364 |
| 5,734,426 A | | 3/1998 | Dong | |
| 5,793,422 A | * | 8/1998 | Mochizuki et al. | 348/296 |
| 5,986,705 A | * | 11/1999 | Shibuya et al. | 348/362 |
| 6,768,511 B1 | * | 7/2004 | Nakai et al. | 348/229.1 |
| 2003/0098914 A1 | * | 5/2003 | Easwar | 348/229.1 |

FOREIGN PATENT DOCUMENTS

| | | |
|---|---|---|
| EP | 0444417 | 9/1991 |
| EP | 0583143 | 2/1994 |

* cited by examiner

*Primary Examiner*—Ngoc-Yen Vu
*Assistant Examiner*—Gary C. Vieaux
(74) *Attorney, Agent, or Firm*—Perkins Coie, LLP

(57) ABSTRACT

In a CMOS image sensor, it is important to control the exposure time or gain. For varying changes in ambient light, the exposure time of the array must be changed. The present invention describes a method for controlling the exposure time or gain to ensure a smooth and fast change in the brightness of the obtained image. If the exposure time is the be decremented or incremented, then the gain control is increased or decreased, respectively to smooth out the changes in image brightness. This substantially reduces image flicker.

8 Claims, 2 Drawing Sheets

METHOD OF FAST AUTOMATIC EXPOSURE OR GAIN CONTROL IN A MOS IMAGE SENSOR

TECHNICAL FIELD OF THE INVENTION

The present invention relates generally to CMOS image sensors, and more particularly, to a method of controlling an exposure time and/or gain of an image sensor.

BACKGROUND OF THE INVENTION

Integrated circuit technology has revolutionized various fields including computers, control systems, telecommunications, and imaging. For example, in the imaging field, CMOS image sensors have proved to be less expensive to manufacture relative to CCD imaging devices. Further, for certain applications CMOS devices are superior in performance. The pixel elements in a MOS device can be made smaller and therefore provide a higher resolution than CCD image sensors. In addition, the signal processing logic necessary can be integrated alongside the imaging circuitry, thus allowing for a single integrated chip to form a complete stand alone imaging device. CMOS image sensors are now available from a variety of manufacturers, including the assignee of the present invention, OmniVision Technologies, Inc.

The primary building block of an image formed by a CMOS image sensor is a pixel. The number, size and spacing of the pixels determine the resolution of the image generated by the imaging device. The pixels of a CMOS image sensor are semiconductor devices that transform incident light photons into current signals. The signal produced by each pixel is generally extremely small.

One important parameter that the CMOS image sensor must be able to control is the exposure time of each pixel to incident light. Similar to light exposure time for photographic film, the exposure time of each pixel must be adjusted to compensate for variations in lighting conditions, such as for indoor or outdoor lighting. An exposure time that is too long will result in an image that is overly bright and washed out. In contrast, an exposure time that is too short will result in an image that is dark and difficult to view.

Another method of varying the intensity of the pixel signals is to adjust the gain of the amplification circuitry. In many ways, controlling the gain is substantially similar to controlling the exposure time. By varying one or both, the image generated by the image sensor can be optimized for viewing.

U.S. Pat. No. 5,734,426 describes one prior art method of controlling exposure time. While adequate for many applications, the speed at which the exposure time can be automatically changed is insufficient for certain applications. For example, for automobile applications, where the automobile may travel from sunlight, to darkness (such as in a tunnel), back to sunlight, it is important for the image sensor to be able to adjust its exposure time quickly.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
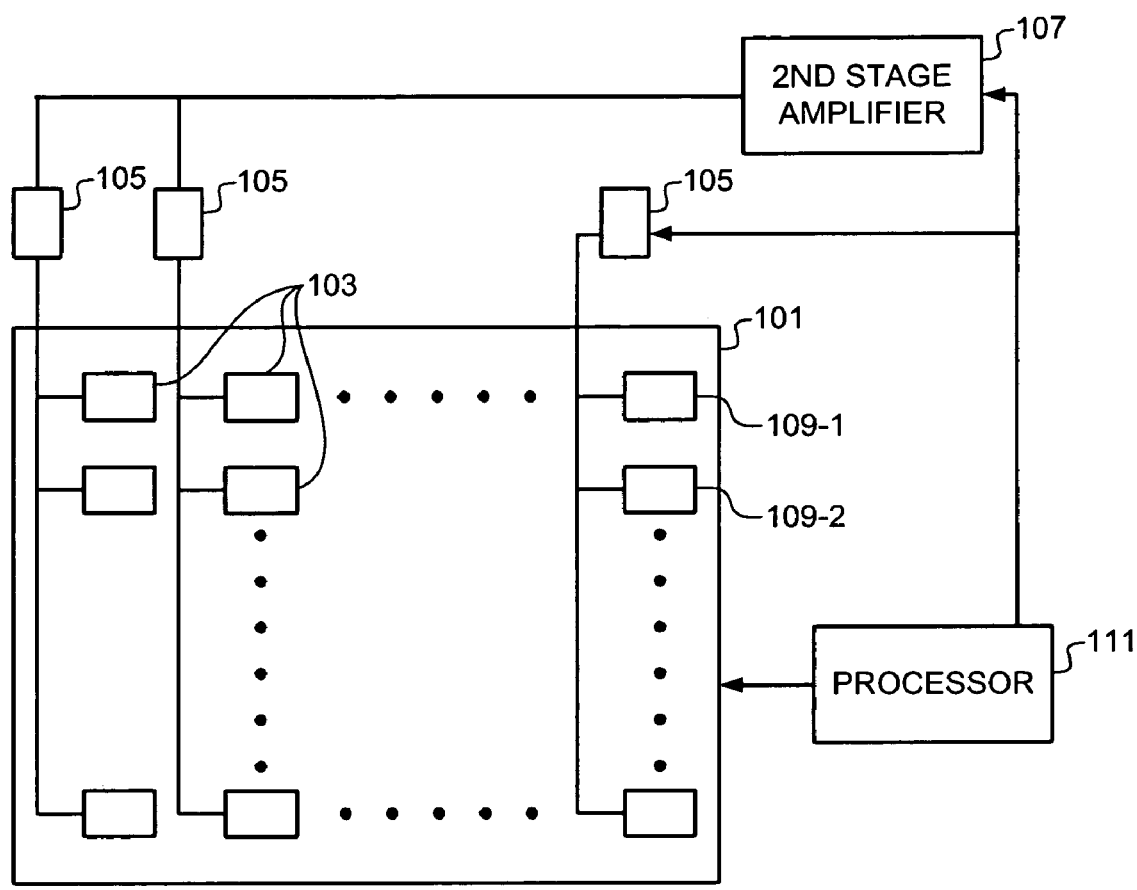
FIG. 1 is a schematic diagram of a CMOS image sensor.

With reference to FIG. 1, an architecture for a CMOS imaging array 101 includes a rectangular matrix of pixels 103. The number of pixels in the horizontal or x-direction, and the number of pixels in the vertical or y-direction, constitutes the resolution of the imaging array 101. Each of the pixels 103 in a vertical column routes its signal to a single charge amplifier 105.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. However, for other applications, different readout protocols may be followed. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed. In various embodiments, either the column amplifier or the second-stage amplifier may be eliminated. The gain of the column amplifier or the second-stage amplifier may be selectively increased or decreased as the need arises. The readout of the pixels 103, the amplifiers 105 and 107, and the calculations and processes described below may be carried out by processor 111.

As noted above, one important function of the image sensor is to be able to automatically control the gain and exposure time of the image sensor to compensate for varying light conditions. Previous attempts to compensate for varying light conditions involve the simple monitoring of pixel output signal magnitudes, and if below a threshold, increase the exposure time or gain, and if above a threshold, decrease the exposure time or gain.

In accordance with the present invention, the amount of decrease or increase in exposure time/gain varies depending upon various factors. Specifically, most image sensors are what are referred to as "line-by-line" exposure devices. In these types of image sensors, each row of the image sensor begins the exposure cycle (also referred to as an integration cycle) at a different instant in time. As an example, referring to FIG. 1, the first row 109-1 of the imaging array 101 would begin exposure to incident light (typically after a reset operation). A short period later, the second row 109-2 of the imaging array 101 would begin exposure to incident light, also after a reset operation. The process continues until all of the rows have been exposed to incident light. Importantly, it should be noted that the exposure time of the first row 109-1 would continue for a length of time, and would typically not finish until many subsequent rows have started the exposure operation.

Indeed, the exposure time for a row is often measured as a number of rows that start the exposure operation. For example, the exposure time for a row may be measured as 16 rows or 20 rows. In other words, the total exposure time for any row is the time it takes to initiate exposure of 16 or 20 subsequent rows.

In one specific numerical example, assume that the imaging array has 640 columns and 480 rows (VGA format). At 30 frames per second, one frame must be captured about every 0.033 seconds. Still further, each row of the imaging array 101 must start the exposure operation about every 68 microseconds (0.033 seconds/480 rows). However, 68 microseconds is rarely enough exposure time to capture enough incident light. Indeed, it may take on the order of a millisecond exposure time in order to generate a usable output signal. Thus, from the time of initiation of exposure to the completion of exposure, 16 or more rows of the imaging array 101 have started the exposure process.

As noted above, the measure of the amount of exposure time is done not so much with a timer, but rather a counter that counts the number of rows that have started the exposure process. The term "exposure row count" is used herein to delineate the exposure time, measured by the number of rows. As such, if the exposure time is to be modified, the exposure row count must be modified.

If the exposure row count is nominally set at 16 rows for a typical light intensity, and if the imaging array 101 is then moved to a relatively brighter environment, the exposure row count should be decreased to decrease the exposure time. However, the decrease in exposure row count can only be done in "whole rows", e.g., the exposure row count cannot go from 16 rows to 15.34 rows, only to 15 rows.

Further, the methods and algorithms used to determine whether or not the exposure time or gain should be adjusted are many and varied. For example, U.S. Pat. No. 5,734,426 to Dong and assigned to the assignee of the present invention shows one method of determining adjustments to exposure or gain. As another example, our U.S. patent application Ser. No. 10/005,776, now U.S. Pat. No. 6,859,230, filed Nov. 7, 2001 entitled "METHOD OF FAST AUTOMATIC EXPOSURE OR GAIN CONTROL IN A MOS IMAGE SENSOR", incorporated herein by reference and assigned to the same assignee as the present invention, discloses another technique. In any event, various methods are possible for determining when to adjust exposure time or gain. In general, these methods attempt to maintain the average magnitude of the output signals from the pixels within a relatively narrow range, e.g. between $V_{HI}$ and $V_{LO}$. The narrow range is also referred to as a "stable range", where no further adjustments to exposure time or gain is required.

The change from a 16 exposure row count to a 15 exposure row count results in a decrease in exposure time of about 6.7%. In many instances, this relatively large amount of percentage change causes an "overshoot" in the frame exposure time or gain. This overshoot, when used in conjunction with an automatic exposure control algorithms, will cause the next image to be outside of the stable range. Subsequent adjustments that tune the exposure time or gain may then cause an overshoot in the other direction. This process will result in flicker of the image.

Figure 2:
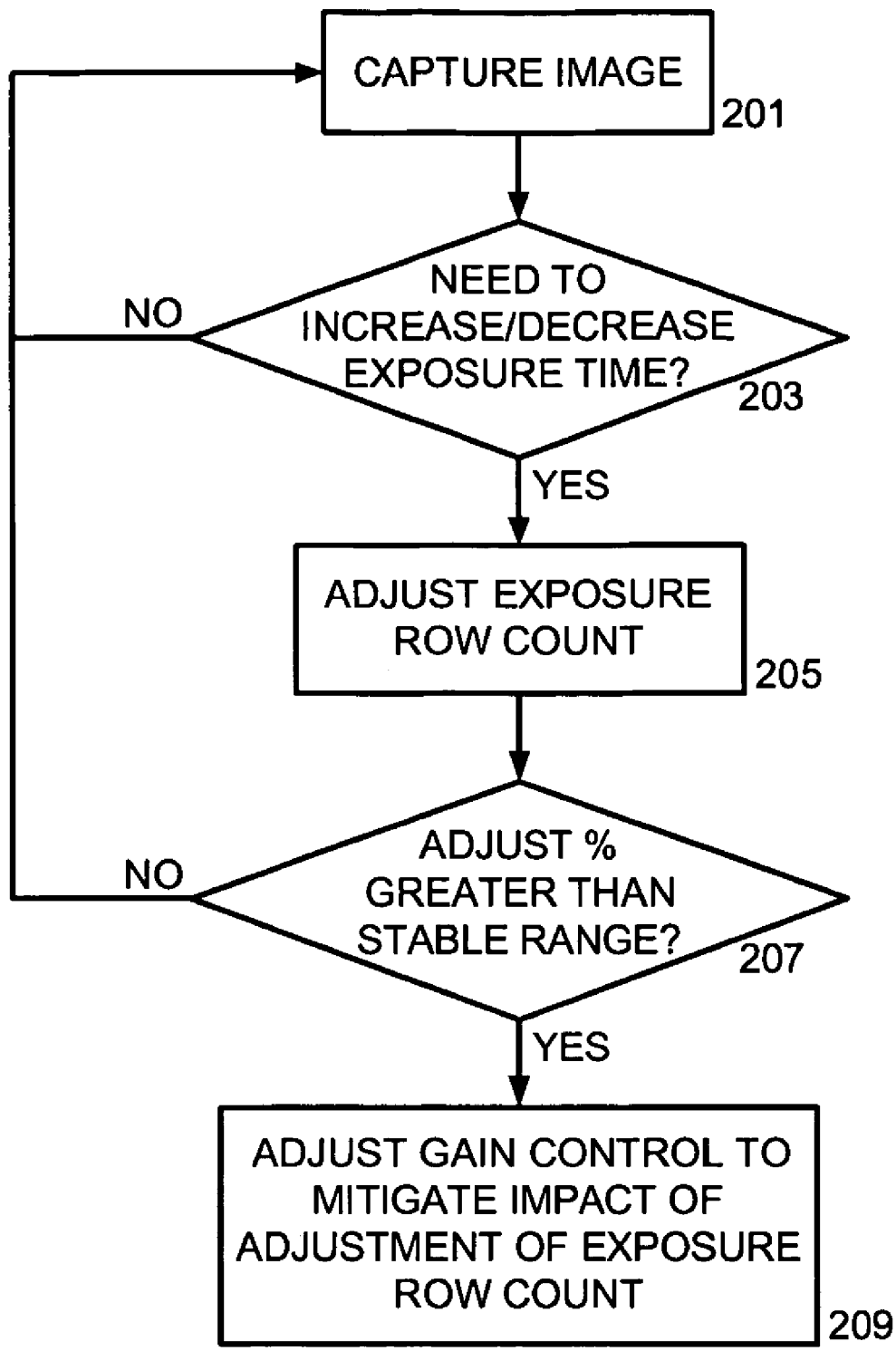
FIG. 2 is a flow diagram illustrating the method of the present invention.

The present invention combines adjustment of exposure time and gain control to provide a smooth transition in the image from varying light conditions. The method of the present invention is shown in FIG. 2. In general, in accordance with the present invention, the exposure row count will be incremented or decremented by an integer value if the change in exposure time is not greater than the magnitude of the stable range. However, if the change in exposure time due to an increment or decrement of one row in the exposure row count is greater than the stable range, the gain control of the image sensor is modified to limit the change in exposure time.

As an example, in one embodiment, the stable range is about 1/16 (or about 6.25%) of the total signal range. It should be noted that the stable range for a particular image sensor will vary based upon the application and specific type of image sensor. The stable range magnitude of 1/16 of the total signal range is merely exemplar. Thus, if the signal range is 0 to 1.0, then the stable range would be between 0.46875 and 0.53125. The magnitude of the stable range is thus 0.0625. Assume that the exposure row count is 20, and that it is determined that the exposure time should be reduced to an exposure row count of 19. This results in a 5% decrease (1/20) in the exposure time. This percentage decrease in the exposure time is less than the magnitude of the stable range (6.25%). Therefore, in this situation, the change in the exposure time would not under any circumstance cause the image to fall outside of the stable range, thereby preventing the overshoot and flicker problem.

However, in a second example, assume that the exposure row count is 15, and that it is determined that the exposure time should be reduced to an exposure row count of 14. This results in a 6.667% decrease (1/15) in the exposure time. This percentage decrease in the exposure time is greater than the magnitude of the stable range (6.25%). Therefore, in this situation, the change in the exposure time would, in some circumstances, cause the image to fall outside of the stable range, thereby raising the possibility of the overshoot and flicker problem.

As seen in FIG. 2, the method of the present invention begins at box 201 by capturing a first image. At box 203, the first image is analyzed to determine if the image falls within the stable range. As noted above, this process may follow the methods disclosed in U.S. Pat. No. 5,734,426 or our copending patent application identified above. After the analysis is complete, a determination is made as to whether the exposure time needs to be increased or decreased. If not, the image sensor continues to capture images at box 201.

If, however, the exposure time needs to be adjusted, at box 205, the exposure row count is adjusted appropriately, typically a one row decrement or a one row increment. Next, at box 207, a determination is made as to whether the resultant adjustment in the exposure row count would change the exposure time (on a percentage basis) by more than a threshold amount. In one embodiment, the threshold amount is approximately the magnitude of the stable range.

If the resultant adjustment does not change the exposure time by more than the threshold amount, the next image is captured at box 201. However, if the resultant adjustment does change the exposure time by more than the threshold, an adjustment to the amplifier gain is made. Thus, the exposure time and the gain control is adjusted to ensure a smooth adjustment of the image brightness.

In one embodiment, when the exposure row count is decreased, the amount of gain is increased by an amount to bring the total effective exposure and gain to some measure between the previous exposure row count and the decremented exposure row count. Similarly, when the exposure row count is to be increased, the amount of gain is decreased by an amount to bring the total effective exposure and gain to some measure between the previous exposure row count and the incremented exposure row count.

In one embodiment, when the exposure row count is decreased, the gain is increased by some percentage dependent upon the current exposure row count. For example, if the exposure row count is between 9 and 16, the gain will be increased by a maximum of 6.25%. If the exposure row count is between 5 and 8, the gain will be increased by a maximum of 12.5%. If the exposure row count is 3 or 4, the gain will be increased by a maximum of 25%. If the exposure row count is 2, the gain will be increased by a maximum of 50%. The foregoing is but one example of how the gain control can be adjusted to increase the smoothness by which image brightness is automatically adjusted.

Further, it can be appreciated that the actual calculations and determinations may take place within and controlled by processor 111.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. Thus, the scope of the invention is indicated by the appended claims rather than by the foregoing description, and all changes which come within the meaning and range of equivalency of the claims are intended to be embraced therein.

What is claimed is:

1. A method of automatically controlling the exposure time and gain of an image sensor, said image sensor including a matrix of pixels, said method comprising:
   determining if a first image provided by said image sensor has an overall brightness that falls within a stable range;
   if said brightness of said first image falls within said stable range, maintaining the exposure time and gain of said image sensor for capture of a subsequent second image;
   if said brightness of said first image falls outside of said stable range, then adjusting said exposure time downward by a first predetermined increment if said brightness is higher than said stable range, else adjusting said exposure time upward by a second predetermined increment if said brightness is lower than said stable range; and
   determining if said adjustment of exposure time downward or upward is greater than a predetermined threshold, and if so, increasing said gain of said image sensor if said exposure time is adjusted downward, else decreasing said gain of said image sensor if said exposure time is adjusted upward, wherein said predetermined threshold is substantially a magnitude of said stable range.

2. The method of claim 1 wherein said exposure time is measured as an exposure row count.

3. The method of claim 2 wherein said first predetermined increment and said second predetermined increment is one row.

4. A method of automatically controlling the exposure time and gain of an image sensor, said image sensor including a matrix of pixels, said method comprising:
   determining if a first image provided by said image sensor has an overall brightness that falls within a stable range;
   if said brightness of said first image falls within said stable range, maintaining the exposure time and gain of said image sensor for capture of a subsequent second image;
   if said brightness of said first image falls outside of said stable range, then adjusting said exposure time downward by a first predetermined increment if said brightness is higher than said stable range, else adjusting said exposure time upward by a second predetermined increment if said brightness is lower than said stable range; and
   determining if said adjustment of exposure time downward or upward is greater than a predetermined threshold, and if so, increasing said gain of said image sensor if said exposure time is adjusted downward, else decreasing said gain of said image sensor if said exposure time is adjusted upward, wherein the amount of increase of said gain is dependent upon the percentage decrease of exposure time and the amount of decrease of said gain is dependent upon the percentage increase of exposure time.

5. An image sensor that includes a matrix of pixels and an adjustable exposure time and gain, the image sensor comprising:
   means for determining if a first image provided by said image sensor has an overall brightness that falls within a stable range;
   means for if said brightness of said first image falls within said stable range, maintaining the exposure time and gain of said image sensor for capture of a subsequent second image;
   means for if said brightness of said first image falls outside of said stable range, then adjusting said exposure time downward by a first predetermined increment if said brightness is higher than said stable range, else adjusting said exposure time upward by a second predetermined increment if said brightness is lower than said stable range; and
   means for determining if said adjustment of exposure time downward or upward is greater than a predetermined threshold, and if so, increasing said gain of said image sensor if said exposure time is adjusted downward, else decreasing said gain of said image sensor if said exposure time is adjusted upward, wherein said predetermined threshold is substantially a magnitude of said stable range.

6. The image sensor of claim 5 wherein said exposure time is measured as an exposure row count.

7. The image sensor of claim 6 wherein said first predetermined increment and said second predetermined increment is one row.

8. An image sensor that includes a matrix of pixels and an adjustable exposure time and gain, the image sensor comprising:
   means for determining if a first image provided by said image sensor has an overall brightness that falls within a stable range;
   means for if said brightness of said first image falls within said stable range, maintaining the exposure time and gain of said image sensor for capture of a subsequent second image;

means for if said brightness of said first image falls outside of said stable range, then adjusting said exposure time downward by a first predetermined increment if said brightness is higher than said stable range, else adjusting said exposure time upward by a second predetermined increment if said brightness is lower than said stable range; and means for determining if said adjustment of exposure time downward or upward is greater than a predetermined threshold, and if so, increasing said gain of said image sensor if said exposure time is adjusted downward, else decreasing said gain of said image sensor if said exposure time is adjusted upward, wherein the amount of increase of said gain is dependent upon the percentage decrease of exposure time and the amount of decrease of said gain is dependent upon the percentage increase of exposure time.

* * * * *